(12) United States Patent
Zulim et al.

(10) Patent No.: US 10,602,590 B1
(45) Date of Patent: Mar. 24, 2020

(54) ISOLATION OF DIGITAL SIGNALS IN A LIGHTING CONTROL TRANSCEIVER

(71) Applicant: ABL IP Holding LLC, Atlanta, GA (US)

(72) Inventors: Dalibor Zulim, Conyers, GA (US); Stefan-Cristian Rezeanu, Greenville, SC (US); Nathaniel Christopher Herwig, Lawrenceville, GA (US)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 16/167,699

(22) Filed: Oct. 23, 2018

(51) Int. Cl.
*H04B 1/38* (2015.01)
*H05B 37/02* (2006.01)
*H04B 1/40* (2015.01)

(52) U.S. Cl.
CPC .......... *H05B 37/0254* (2013.01); *H04B 1/40* (2013.01)

(58) Field of Classification Search
CPC .............................. H05B 37/0254; H04B 1/40
USPC ......................................................... 375/219
See application file for complete search history.

(56) References Cited

U.S. PATENT DOCUMENTS

| | | | |
|---|---|---|---|
| 5,506,539 A | 4/1996 | Kelly et al. | |
| 6,144,326 A * | 11/2000 | Krone | H04L 25/0266 341/118 |
| 6,442,213 B1 * | 8/2002 | Krone | H04L 25/0266 341/118 |
| 6,876,224 B2 | 4/2005 | Marshall et al. | |
| 7,483,682 B2 * | 1/2009 | Williams | H04B 1/48 455/180.1 |
| 7,733,796 B2 | 6/2010 | Boeckle et al. | |
| 8,072,164 B2 | 12/2011 | Ilyes et al. | |
| 8,358,088 B2 | 1/2013 | Boeckle | |
| 9,131,549 B2 | 9/2015 | Rezeanu | |
| 9,439,270 B2 | 9/2016 | Rezeanu | |
| 9,521,730 B2 | 12/2016 | Rezeanu | |
| 9,706,621 B2 | 7/2017 | Yang et al. | |
| 9,743,474 B2 | 8/2017 | Scheidegger et al. | |

(Continued)

FOREIGN PATENT DOCUMENTS

| | | |
|---|---|---|
| EP | 2910092 | 8/2015 |
| EP | 2924894 | 9/2015 |

(Continued)

*Primary Examiner* — Helene E Tayong
(74) *Attorney, Agent, or Firm* — Kilpatrick Townsend & Stockton LLP

(57) ABSTRACT

A transceiver in a lighting system may include a digital isolation component having multiple channels and an isolation barrier. The digital isolation component may accept an outbound digital signal or an inbound digital signal. On a first channel, the outbound signal may be modulated with a high-frequency signal, and provided across the isolation barrier to the non-isolated side. On the non-isolated side, a modified outbound signal may be generated based on the modulated high-frequency signal. On a second channel, the inbound signal may be modulated with a high-frequency signal that is provided across the isolation barrier to the isolated side. On the isolated side, a modified inbound signal may be generated based on the modulated high-frequency signal. The transceiver may include a voltage level comparator configured to adjust voltage levels of the signals, or an edge transition or duty cycle balancer configured to adjust edges of the signals.

20 Claims, 7 Drawing Sheets

(56) References Cited

U.S. PATENT DOCUMENTS

| | | | |
|---|---|---|---|
| 2004/0225811 A1* | 11/2004 | Fosler | H05B 37/0254 710/305 |
| 2005/0152439 A1 | 7/2005 | Beij et al. | |
| 2005/0152440 A1 | 7/2005 | Beij et al. | |
| 2010/0102747 A1* | 4/2010 | Ilyes | H05B 37/0254 315/291 |
| 2011/0140611 A1* | 6/2011 | Elek | H05B 37/0272 315/130 |
| 2012/0324296 A1 | 12/2012 | Hoffknecht et al. | |
| 2013/0265700 A1 | 10/2013 | Parker et al. | |
| 2014/0359373 A1 | 12/2014 | Hoffknecht et al. | |
| 2015/0008844 A1* | 1/2015 | Wilson | H02J 9/02 315/291 |
| 2015/0076994 A1 | 3/2015 | Rezeanu | |
| 2015/0084547 A1* | 3/2015 | Yeh | H04L 12/2807 315/312 |
| 2015/0223306 A1* | 8/2015 | Rezeanu | H05B 37/0254 315/200 R |
| 2016/0057837 A1 | 2/2016 | Brand et al. | |
| 2016/0174340 A1* | 6/2016 | Rezeanu | H05B 37/0254 315/200 R |
| 2016/0269126 A1* | 9/2016 | Maung | H04B 10/25 |
| 2017/0055331 A1 | 2/2017 | Rezeanu | |
| 2018/0225230 A1* | 8/2018 | Litichever | G06F 21/56 |

FOREIGN PATENT DOCUMENTS

| | | |
|---|---|---|
| EP | 2837096 | 1/2016 |
| EP | 2875702 | 9/2016 |
| WO | 2010062449 | 6/2010 |
| WO | 2012003541 | 1/2012 |
| WO | 2012174328 | 12/2012 |
| WO | 2013153510 | 10/2013 |
| WO | 2012174328 | 1/2014 |
| WO | 2014013454 | 4/2014 |
| WO | 2014060922 A2 | 4/2014 |
| WO | 2014060922 A3 | 4/2014 |
| WO | 2015023632 | 2/2015 |

* cited by examiner

ISOLATION OF DIGITAL SIGNALS IN A LIGHTING CONTROL TRANSCEIVER

FIELD OF THE INVENTION

This disclosure relates generally to the field of lighting control interfaces, and more specifically relates to isolation of electrical signals by a transceiver in a lighting control system.

BACKGROUND

Instructions for operation of a lighting network may be distributed to lighting fixtures in the network via a digital addressable lighting interface ("DALI"). A control component that is included in a DALI lighting system may receive a signal, transmit a signal, or both transmit and receive signals. The control component may transmit signals to other components in the DALI lighting system, such as signals including encoded instructions for lighting fixtures. In addition, the control component may receive signals from the other components, such as signals including encoded information from lighting fixtures.

A signal bus may connect multiple control components in the DALI lighting system. Signals that are carried via the signal bus may be provided to, and received from, the bus via an isolation component. Conventional systems may include an optocoupler configured as an isolation component, such as an optocoupler configured to provide or receive signals carried on the signal bus. However, an optocoupler may have an unequal response rate on a rising edge of a signal as compared to a falling edge of the signal. Furthermore, a control component that is configured to receive signals and transmit signals may require a separate optocoupler for each signal channel (e.g., a first optocoupler to receive signals, a second optocoupler to transmit signals).

It is desirable to develop techniques to transmit and receive electrically isolated signals with equal or similar rise times and fall times. In addition, it is desirable to develop a control component that is capable of electrically isolating transmitted or received signals using a smaller quantity of isolation components, such as to reduce costs related to production of the control component or to increase reliability of the control component.

SUMMARY

According to certain implementations, a control component included in a DALI lighting system is configured to isolate electrical signals received from or transmitted to one or more other components of the DALI lighting system. The control component may include one or more of a transmitter, a receiver, or a transceiver (e.g., a component that is capable of receiving signals and transmitting signals). In some implementations, a transceiver in the DALI lighting system may include a digital isolation component. The digital isolation component may be coupled to a transmission sub-circuit and a receiver sub-circuit that are included in the control component. In addition, the digital isolation component may include an isolation barrier, and one or more channels via which electrical signals may be received or provided.

In some implementations, the digital isolation component may be configured to accept an outbound digital signal that comprises encoded instructions for a component in the DALI lighting system. The outbound signal may be accepted via a first input of a first channel, and the first input may be on an isolated side of the isolation barrier. In addition, the outbound signal may be modulated with a high-frequency signal, and the modulated outbound digital signal may be coupled across the isolation barrier to a non-isolated side of the barrier. On the non-isolated side, the modulated outbound digital signal may be demodulated. A modified outbound digital signal comprising the encoded instructions may be generated based on the demodulated signal. In addition, the modified outbound signal may be provided to an input of the transmission sub-circuit via a first output from the first channel. In some cases, the modified outbound signal may be provided to an electrical signal bus of the DALI lighting system.

In some aspects, the digital isolation component may be configured to accept an inbound digital signal comprising additional encoded instructions. The inbound signal may be accepted by a second input of a second channel, and the second input may be on the non-isolated side of the barrier. The inbound signal may be modulated with an additional high-frequency signal, and the modulated inbound digital signal may be transmitted across the isolation barrier to the isolated side of the barrier. On the isolated side, the modulated inbound digital signal may be demodulated. A modified inbound digital signal comprising the additional encoded instructions may be generated based on the demodulated signal. The modified inbound signal may be provided to an input of a receiver sub-circuit via a second output of the second channel. In some cases, the modified inbound signal may be provided to an additional component of the DALI lighting system.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1:
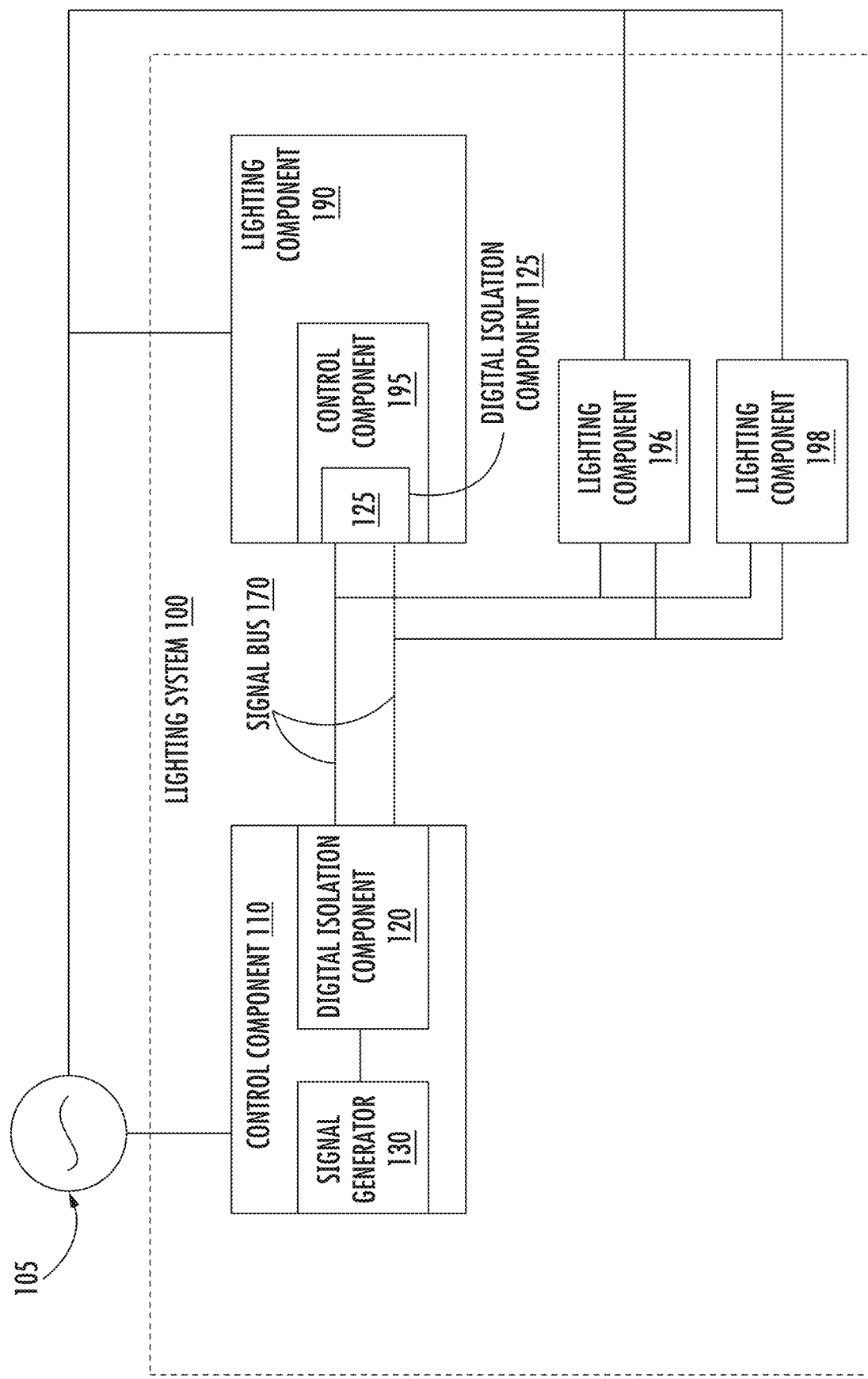
FIG. 1 is a block diagram depicting an example of a lighting system, such as a DALI lighting system, that is capable of receiving or transmitting isolated signals.

As discussed above, prior techniques for isolating signals may not provide for equivalent response rates on rising and falling edges of digital signals. In addition, prior techniques for isolating signal may include multiple isolation components, such as an isolation component for receiving a signal and another isolation component for transmitting a signal. Certain implementations described herein provide for a multi-channel digital isolation component that is configured to transmit or receive isolated multiple digital signals. In addition, the multi-channel digital isolation component may be configured to maintain relatively equivalent response rates on rising and falling edges of digital signals. Maintaining relatively equivalent response rates may enable the signals to be isolated using fewer electrical components, leading to improvements in manufacturing costs, and reduced power consumption by the multi-channel digital isolation component, leading to improved energy efficiency and reduced power loss (e.g., as heat). A digital isolation component may have a smaller size as compared to other types of isolators, such as optocouplers, resulting in a reduced physical size of manufactured products that include digital isolation components. In addition, a digital isolation component may have a lower failure rate or more stable electrical properties as compared to other isolator types, resulting in an extended lifespan, with more stable properties over time, of the manufactured products that include digital isolation components. Furthermore, a digital isolation component may have better compliance in regards to standards governing a DALI lighting systems (e.g., IEC 62386), such as standards governing a duty cycle or a slew rate on rising or falling edges of a compliant electrical signal. For example, a component in a DALI lighting system (e.g., a power supply, a control gear, a control device) that is configured to isolate electrical signals with a digital isolation component may have improved compliance with standards governing the DALI lighting systems In some cases, a signal, such as a signal for a DALI system, may include multiple properties, such as a voltage, a voltage offset, a frequency (e.g., a oscillation frequency, a baud rate), a time offset, a time duration, or other signal properties. In addition, a signal may include multiple components, such as a signal that is a combination of multiple component signals each having various respective voltages, voltage offsets, frequencies, time offsets, time durations, or other signal properties. Techniques are described herein for isolating signals. For example, a component signal that is included in a non-isolated signal may be isolated out, such that additional components of the non-isolated signal are removed. In some cases, isolation of a signal may be performed by a combination of one or more techniques. In addition, isolation may be performed by one or more components, such as a digital isolation component, or by any suitable component. An isolated signal may be carried by one or more components, circuits, or sub-circuits that are electrically isolated, such that additional electrical signals are not introduced to the isolated signal. For example, an isolated circuit or component may be configured to prevent an isolated signal from being combined with additional signals. In addition, a non-isolated signal may be carried by one or more components, circuits, or sub-circuits that are non-isolated, such that additional electrical signals may be introduced to the isolated signal. For example, a non-isolated circuit or component may be configured such that a non-isolated signal (including a signal that had been provided from an isolated component or circuit) may become combined with additional signals.

In some aspects, a signal is isolated with respect to one or more particular selected component signals or signal properties. For example, a first non-isolated signal includes a selected component, such as a component signal including voltages (or differences in voltages) that indicate digitally encoded instructions. The first non-isolated signal may be isolated with respect to the selected component, such that the voltages (e.g., high or low bits) are included in the first isolated signal, and additional component signals of the first non-isolated signal that are unrelated to the instructions are omitted from the first isolated signal. In addition, a second non-isolated signal that includes a selected frequency property (e.g., a DC voltage level, an oscillating signal at a particular frequency) may be isolated with respect to the selected frequency, such that the frequency property is included in the second isolated signal, and unselected properties (e.g., additional frequencies) of the second non-isolated signal are omitted from the second isolated signal.

Referring now to the drawings, FIG. 1 is a block diagram depicting an example of a lighting system 100, such as a DALI lighting system, that is capable of receiving or transmitting (or both) isolated signals. The isolated signals may be transmitted and/or received by a control component 110 or one or more additional components in the lighting system 100, such as a lighting component 190, a lighting component 196, or a lighting component 198. In addition, the isolated signals may be transmitted via one or more signal buses, such as a signal bus 170. The signal bus 170 may include a two-line bus, such as (but not limited to) a wire pair, or a twisted-pair wire bus. The signal bus 170 may be bidirectional. In some cases, the signal bus 170 may carry a transmitted signal via multiple wires of the signal bus, such as a signal represented by a differential voltage between two wires of the signal bus 170. In some configurations, such as in a DALI lighting system, the lighting components 190, 196, and 198 are connected to the signal bus 170 in a parallel configuration.

In some implementations, the control component 110 may have a digital isolation component 120. The digital isolation component 120 may be configured to provide electrical isolation to a portion of the control component 110, such that the control component 110 has an isolated side and a non-isolated side. In the lighting system 100, the signal bus 170 may be connected to the non-isolated side of the control component 110, and a signal generator 130 may be included in (or connected to) the isolated side of the control component 110. In addition, the signal generator 130 may be connected to the non-isolated side of the digital isolation component 120. In some implementations, an alternating current ("AC") power supply 105 may be connected to one or more of the control component 110 or the lighting components 190, 196, or 198. FIG. 1 is depicted as having the AC power supply 105, but other types of power supplies may be used, such as a direct current ("DC") power supply, one or more batteries, or any other suitable power supply. One or more of the control components 110 or 195 may include additional components or sub-circuits related to isolating signals received from the power supply 105.

In some cases, the lighting component 190 may include an additional control component 195, with an additional digital isolation component 125. The additional digital isolation component 125 may be configured to provide electrical isolation to a portion of the lighting component 190, such that the lighting component 190 has an isolated side and a non-isolated side. In addition, the signal bus 170 may be connected to the non-isolated side of the lighting component 190. In some implementations, such as in a DALI lighting system, the control component 110 may be referred to as a "control device" or a "master" component, and the additional control component 195 may be referred to as a "control gear" or a "slave" component. A control device may be configured for providing control signals to one or more control gears. In addition, a control device may be configured to receive response signals (e.g., acknowledgements, responses to requests for information) from one or more control gears. In some cases, the signal bus 170 is configured to carry transmitted signals to or from multiple components in a DALI lighting system, such as from a control device to up to sixty-four control gears. For example, the signal bus 170 may be configured to carry transmitted signals to or from additional control components included in one or more of the lighting components 196 or 198.

In an implementation, the control component 110 accepts (or otherwise receives) a signal that includes encoded instructions for one or more components of the lighting system 100. The signal generator 130, such as a DALI signal generator, may generate the signal. In addition, the control component 110 may accept the signal from another component of the lighting system 100, such as an additional control component, an input device (e.g., a lighting control switch, a programmed memory device), an additional signal generator, or any other suitable component.

In the lighting system 100, the control component 110 may provide the accepted signal to the signal bus 170 via the digital isolation component 120. For example, the digital isolation component 120 may accept the signal on the isolated side of the digital isolation component 120. The digital isolation component 120 may generate on the non-isolated side a modified signal that is based on the accepted signal. The modified non-isolated signal may include the encoded instructions.

In some implementations, the modified signal is provided to the signal bus 170. The signal bus 170 may include a pair of lines, such as wires (or other conductors) arranged in a pair. The signal bus 170 may be configured to carry signals transmitted from the control component 110 to other components connected to the signal bus 170, such as one or more of the lighting components 190, 196, or 198. The signal bus 170 may also be configured to carry signals transmitted from other components connected to the signal bus 170 to the control component 110. In some cases, the signal bus 170 may be connected to a transmitter included in the control component 110. In addition, the signal bus may be connected to a receiver included in the control component 110.

In some implementations, the signal carried by the signal bus 170 may include additional electrical signals, including electrical noise, interference, or any other electrical signal that is not associated with instructions for a component in the lighting system 100. For example, the modified signal may include (or have introduced) electrical signals related to low-frequency signals (e.g., 60 Hz, 50 Hz), a voltage offset, transient spikes in a voltage level of the signal, or additional signals that are not associated with instructions for a component in the lighting system 100. In some cases, the additional electrical signals are introduced via the signal bus 170, such as wireless signals that are inadvertently received by wires of the signal bus 170 (e.g., inadvertently acting as antennae, inadvertently coupling with nearby wires)

In some cases, the additional electrical signals may include signals that are considered unwanted electrical signals. Unwanted electrical signals may include signals that are not compliant with an industry standard for a DALI lighting system. For example, additional electrical signals may include signals with characteristics that are not compliant with IEC standard 62386, such as signals with frequency greater than 1200 Hz. In addition, unwanted electrical signals may include signals that are not useable by one or more isolated components of the control components 110 or 195. For example, components related to low-voltage (e.g., about 0 V to about 3 V) control signals may be isolated to prevent additional signals with voltages greater than low-voltage (e.g., greater than about 5 V) from affecting, and potentially damaging, the low-voltage components. In addition, the modified non-isolated signal may include additional electrical signals.

In the lighting system 100, the signal carried via the signal bus 170 may be received by the additional digital isolation component 125 in the lighting component 190, or additional digital isolation components included in one or more of lighting components 196 or 198. The received signal may include the modified signal provided by the control component 110, including the encoded instructions. The received signal may also include one or more additional electrical signals. In some cases, the additional digital isolation component 125 may receive the signal on a non-isolated side, and generate on the isolated side another modified signal that is based on the received signal. The modified isolated signal may include the encoded instructions. In addition, the modified isolated signal may omit the additional electrical signals. For example, the modified signal may omit electrical signals related to low-frequency signals (e.g., 60 Hz, 50 Hz), a voltage offset, transient spikes in a voltage level of the received signal, or additional signals that are not associated with instructions for a component in the lighting system 100.

Figure 2:
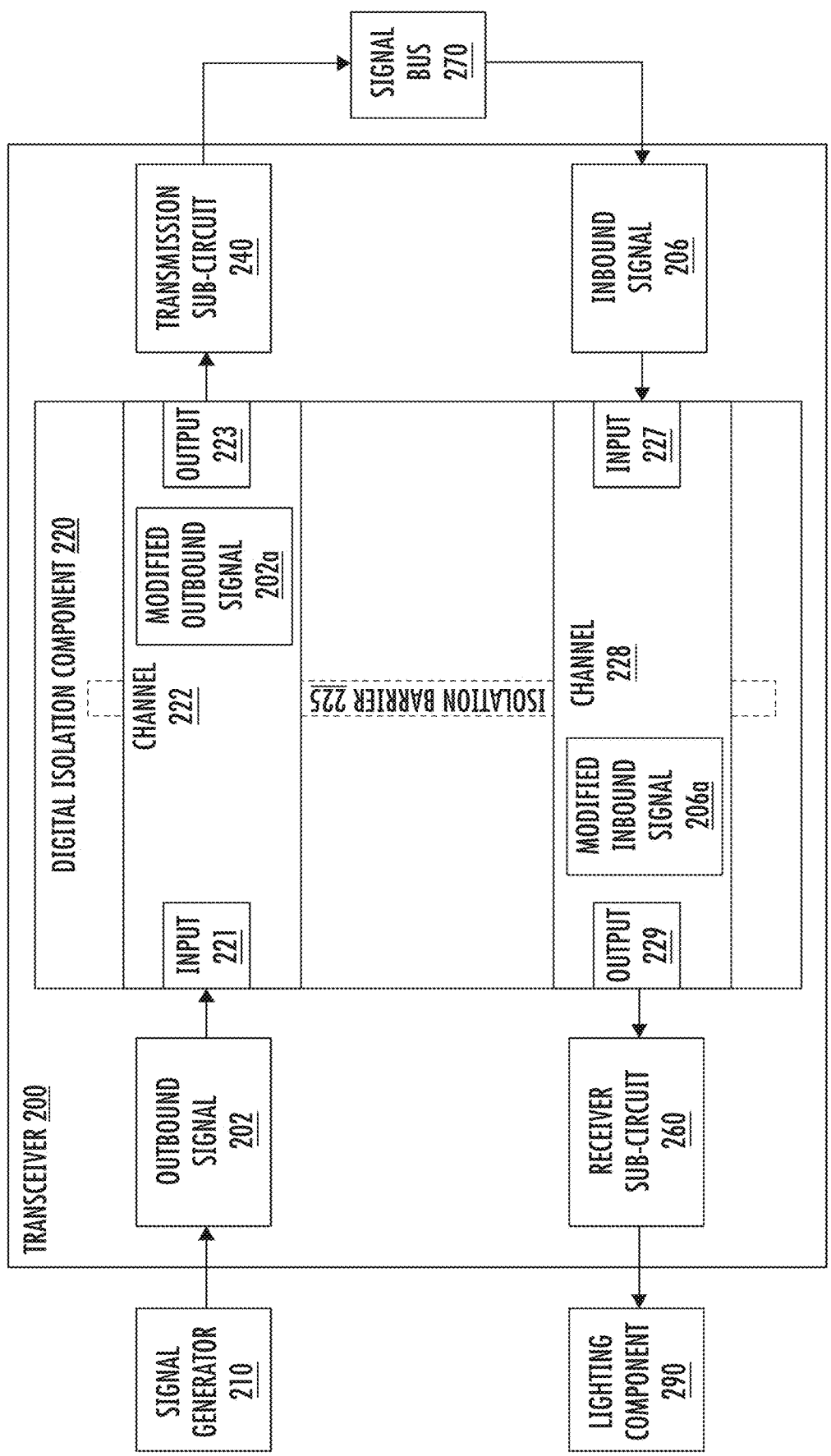
FIG. 2 is a block diagram depicting an example of a transceiver that includes a digital isolation component with multiple channels.

FIG. 2 includes a block diagram depicting an example of a transceiver 200 that includes a digital isolation component 220 with multiple channels, such as channel 222 and channel 228. In some cases, one of the channels may be configured to carry received signals and another of the channels may be configured to carry signals for transmission. The digital isolation component 220 may be configured to provide electrical isolation to a portion of the transceiver 200, such that the transceiver 200 has an isolated side and a non-isolated side. In addition, the digital isolation component 220 may be configured to provide an isolation barrier 225. For example, circuit components, connections, and other electrically passive, reactive, or active elements (e.g., capacitors, op-amps, transistors) on the isolated side of the isolation barrier 225 (including an isolated portion of the digital isolation component 220) may be protected by one or more isolation techniques, such as capacitive coupling, magnetic coupling, air gaps, optical isolation, shielding, sub-circuits configured to remove one or more frequencies (including zero-frequency signal components, such as a DC offset), or any other suitable isolation technique. In some cases, the digital isolation component 220 may omit optical isolation techniques, such as optocoupler components. For convenience, and not by way of limitation, areas in FIG. 2 that are depicted to the left of the isolation barrier 225 may be described as being on the isolated side of the transceiver 200, and areas in FIG. 2 depicted to the right of the isolation barrier 225 may be described as being on the non-isolated side of the transceiver 200.

In some implementations, the transceiver 200 may be included in a DALI lighting system, such as in a control device or a control gear. The transceiver 200 may be connected to a signal bus in the DALI lighting system, such as an signal bus 270. The signal bus 270 may include a bidirectional bus having two or more wires. In addition, the transceiver 200 may be connected to one or more additional components in the DALI lighting system, such as a signal generator 210 or a lighting component 290. In some cases, one or more of the signal generator 210 or the lighting component 290 may each include a respective microprocessor, such as a microprocessor that is configured to generate or interpret digital signals, but other configurations are possible. FIG. 2 depicts the transceiver 200 as being connected to both the signal generator 210 and the lighting component 290, but other configurations are possible. For example, a transceiver in a control device may be connected to a signal generator but not a lighting component. In addition, a transceiver in a control gear may be connected to a lighting component but not a signal generator. Also, a transceiver may be connected to a further component of a DALI lighting system, such as an input device or a power supply. In some cases, the transceiver 200 may transmit signals to additional components of a DALI lighting system, such as to one or more of additional lighting components that may be connected by the signal bus 270. For example, one or more lighting components (e.g., the lighting component 190, depicted in regards to FIG. 1) may be connected to the signal bus 270, such as via a parallel connection to two wires that are included in the signal bus 270.

In the transceiver 200, the isolation barrier 225 may be configured such that each channel of the digital isolation component 220 accepts an electrical signal and provides the electrical signal, or a modified signal based on the accepted electrical signal, across the isolation barrier 225. In some cases, the channel 222 may be configured to accept a first electrical signal on the isolated side of the transceiver 200, and to provide a first modified electrical signal on the non-isolated side of the transceiver 200. In addition, the channel 228 may be configured to accept a second electrical signal on the non-isolated side of the transceiver 200, and to provide a second modified electrical signal on the isolated side of the transceiver 200.

In some implementations, the transceiver 200 may receive an outbound electrical signal 202, such as from the signal generator 210. For example, but not by way of limitation, a transceiver in a control device may accept an outbound signal for transmission on a signal bus. The outbound signal 202 may include digitally encoded instructions for a component of the DALI lighting system. In addition, the outbound signal 202 may be electrically isolated, such as a signal accepted from the signal generator 210. In the transceiver 200, the digital isolation component 220 may accept the outbound signal 202 on a first input, such as an input 221 provided to the channel 222. The first input may be on the isolated side of the isolation barrier 225 in the transceiver 200.

The channel 222 may accept the outbound signal 202 via the input 221. In addition, the channel 222 may provide a modified electrical signal that is based on the outbound signal 202. For example, the channel 222, or one or more sub-circuits included in the channel 222, may modulate the outbound signal 202 with a high-frequency electrical signal. The modulated high-frequency signal may include an encoded representation of information included in the outbound signal 202, such as a representation of the digitally encoded instructions. The modulated high-frequency signal may be provided across the isolation barrier 225 to the non-isolated side of the barrier 225, such as via capacitive coupling, magnetic coupling, or other suitable coupling techniques. The modulated high-frequency signal may be demodulated on the non-isolated side of the barrier 225. In addition, the channel 222, or the included sub-circuit(s), may generate a modified outbound signal 202a on the non-isolated side of the isolation barrier 225. The modified outbound signal 202a may be based on one or more of the outbound signal 202 or the modulated high-frequency signal. In some cases, the modified outbound signal 202a may include the digitally encoded instructions represented by the modulated high-frequency signal or included in the outbound signal 202. In addition, the modified outbound signal 202a may include (or have introduced) unwanted electrical signals.

In some implementations, the modified outbound signal 202a is provided by the digital isolation component 220 via a first output, such as an output 223 from the channel 222. The first output may be on the non-isolated side of the isolation barrier 225. The channel 222 may provide the modified outbound signal 202a via the output 223. In some cases, the modified outbound signal 202a is provided to an additional component (or sub-component) of the transceiver 200, such as a transmission sub-circuit 240. For example, the transmission sub-circuit 240 may transmit the modified outbound signal 202a to one or more additional components of the DALI lighting system, such as by transmitting the modified outbound signal 202a via the signal bus 270. In addition, the digitally encoded instructions included in the modified outbound signal 202a may be provided to the additional component(s) via the transmission from the transmission sub-circuit 240, carried by the signal bus 270. In some cases, unwanted electrical signals may be introduced to the modified outbound signal 202a during transmission on the signal bus 270. For example, unwanted wireless signals may be picked up by the signal bus 270, such as via inadvertent antenna behavior by a pair of wires in the bus 270.

In some implementations, the transceiver 200 may receive an inbound electrical signal 206, such as from the signal bus 270. For example, but not by way of limitation, a transceiver in a control gear may receive an inbound signal from a signal bus. The inbound signal 206 may include digitally encoded instructions for a component of the DALI lighting system, such as the lighting component 290. In addition, the inbound signal 206 may include unwanted electrical signals, such as electrical noise. In the transceiver 200, the digital isolation component 220 may accept the inbound signal on a second input, such as the input 227 provided to the channel 228. The second input may be on the non-isolated side of the isolation barrier 225 in the transceiver 200.

The channel 228 may accept the inbound signal 206 via the input 227. In addition, the channel 228 may provide an additional modified electrical signal that is based on the inbound signal 206. For example, the channel 228, or one or more included sub-circuits, may modulate the inbound signal 206 with an additional high-frequency electrical signal. The additional modulated high-frequency signal may include an encoded representation of information included in the inbound signal 206, such as a representation of the digitally encoded instructions. The additional modulated high-frequency signal may be provided across the isolation barrier 225 to the isolated side of the barrier 225, such as via capacitive coupling, magnetic coupling, or other suitable coupling techniques. The additional modulated high-frequency signal may be demodulated on the isolated side of the isolation barrier 225. In addition, the channel 228, or the included sub-circuit(s), may generate a modified inbound signal 206a on the isolated side of the isolation barrier 225. The modified inbound signal 206a may be based on one or more of the inbound signal 206 or the additional modulated high-frequency signal. In some cases, the modified inbound signal 206a may include the digitally encoded instructions represented by the additional modulated high-frequency signal or included in the inbound signal 206. In addition, the modified inbound signal 206a may omit unwanted electrical signals included in the inbound signal 206.

In some implementations, the modified inbound signal 206a is provided by the digital isolation component 220 via a second output, such as an output 229 from the channel 228. The second output may be on the isolated side of the isolation barrier 225. The channel 228 may provide the modified inbound signal 206a via the output 229. In some cases, the modified inbound signal 206a is provided to an additional component (or sub-component) of the transceiver 200, such as a receiver sub-circuit 260. For example, the receiver sub-circuit 260 may provide the modified inbound signal 206a to one or more additional components of the DALI lighting system, such as to the lighting component 290. In addition, the digitally encoded instructions included in the modified inbound signal 206a may be received by the additional component(s) via the modified inbound signal 206a.

In some implementations, a transceiver included in a control device may receive an inbound signal, or a transceiver in a control gear may transmit an outbound signal. For example, a transceiver in a control gear may transmit an outbound signal, such as data or a response to a request. In addition, a transceiver in a control device may receive an inbound signal, such as data or a response from the control gear.

Figure 3B:
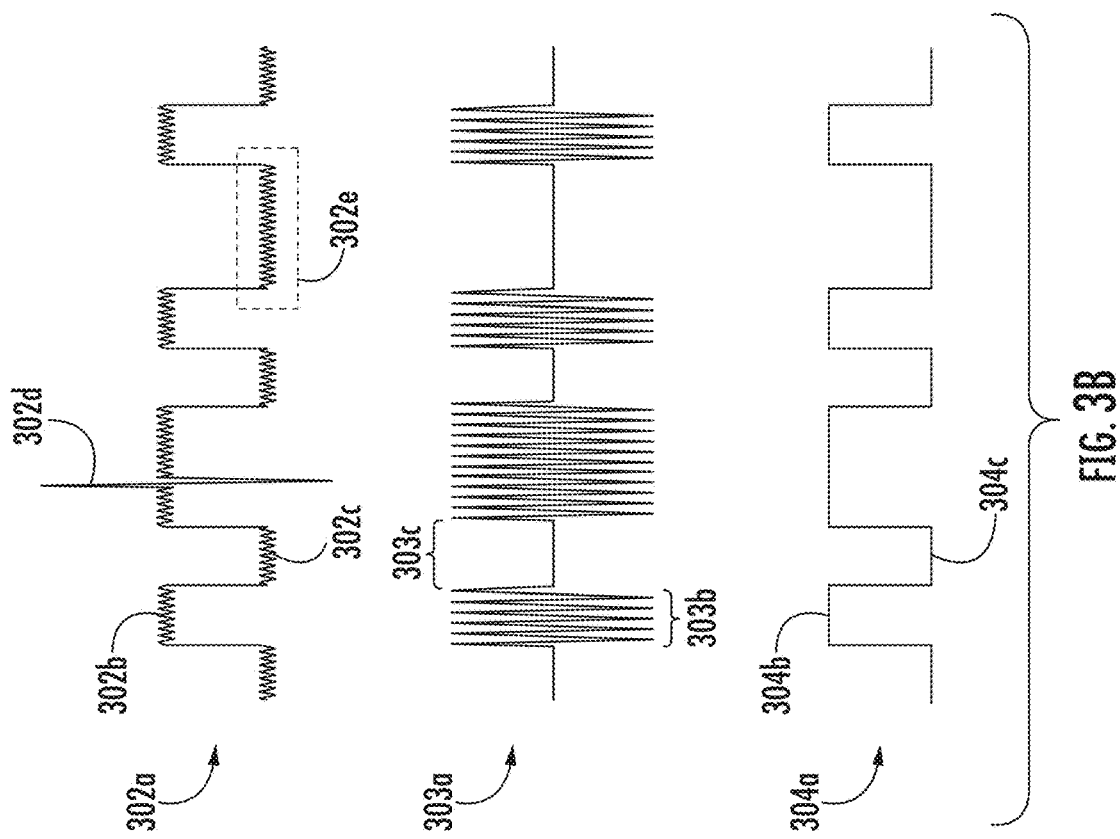
FIG. 3b is a diagram depicting a several example waveforms of electrical signals that may be accepted, generated, or provided by the transceiver (FIGS. 3a and 3b are collectively referred to herein as FIG. 3)
Figure 3A:
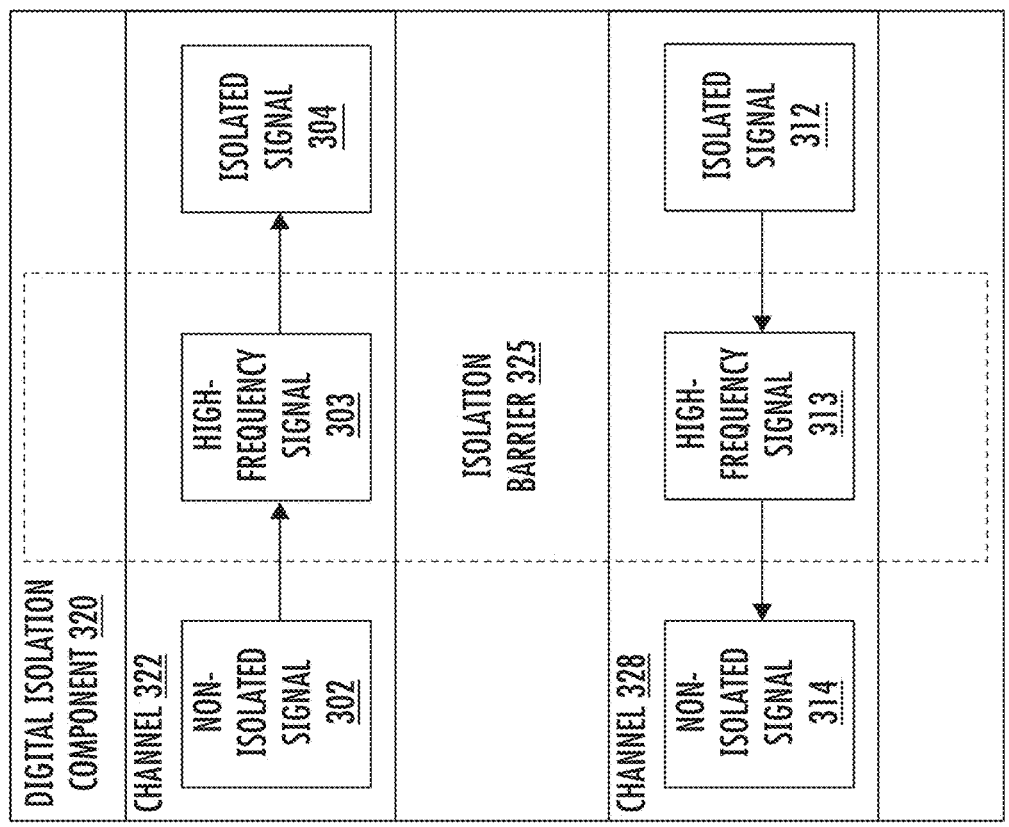
FIG. 3a is a block diagram depicting an example of a digital isolation component in a transceiver and electrical signals that may be accepted, generated, or provided by the digital isolation component.

FIG. 3a is a block diagram depicting an example of a digital isolation component in a transceiver in a DALI lighting system, such as the transceiver 200, and electrical signals that may be accepted, generated, or provided by the digital isolation component. FIG. 3b is a diagram depicting several example waveforms of electrical signals that may be accepted, generated, or provided by the transceiver. In some implementations, the signals are accepted, generated, or provided by one or more components included in a digital isolation component, such as a digital isolation component 320. The digital isolation component 320 may include one or more channels, such as a channel 322 and a channel 328. In addition, the digital isolation component 320 may be configured to provide an isolation barrier 325, such that the digital isolation component 320 has an isolated portion and a non-isolated portion.

A signal that is accepted by the digital isolation component 320 may include a digital signal, such as an electrical signal that conforms to a standard for digital communications. In some cases, the digital signal may conform to an industry standard for a DALI lighting system, such as IEC standard 62386. In addition, the digital signal may be a low-voltage signal on which a conforming signal may be based. For example, a signal generator may generate a low-voltage signal (e.g., having a peak-to-peak amplitude between about 0V and about 3.3V, between about 0V and about 5V) in an isolated portion of a control component. In addition, a signal conforming to an industry standard (e.g., having an amplitude between about 0V and about 16V) may be received from a signal bus, on a non-isolated portion of the control component. The digital signal may include a digitally encoded instruction, such as an instruction for a component in a DALI lighting system. For example, the digital signal may include one or more bits that represent encoded instructions for the component. The instructions may be encoded via Manchester encoding, but other encoding techniques may be used. Bits included in the digital signal may have one or more attributes, such as a voltage level (e.g., high bit, low bit), a voltage change (e.g., high-to-low bit, low-to-high bit), a duration, an offset (e.g., time offset, DC offset), an edge transition time (e.g., a rise time, a fall time), or any other suitable attribute.

In some cases, the accepted digital signal may include multiple component signals. For example, the digital signal may be a composite signal that includes the digitally encoded instruction and also includes one or more additional electrical signals. The composite signal may include component signals that are related to power signals (e.g., 60 Hz, 50 Hz), voltage offsets, carrier frequencies, electrical spikes, additional sets of digitally encoded instructions, or other electrical signals.

In some implementations, the digital isolation component 320 may accept a non-isolated signal 302. The non-isolated signal 302 may be accepted via an input on a non-isolated side of the digital isolation component 320, such as an input to the channel 322. The non-isolated signal 302 may be accepted by a receiver sub-circuit in a transceiver, such as from a signal bus in a DALI lighting system. The non-isolated signal 302 may include digitally encoded instructions, such as an inbound signal that includes instructions for a component in the DALI lighting system. In addition, the non-isolated signal 302 may be a composite signal that includes one or more additional signals. For example, the non-isolated signal 302 may have a waveform 302a. The waveform 302a may include one or more bits representing the instructions, such as a high bit 302b and a low bit 302c. The waveform 302a may have one or more properties that are related to the digitally encoded instructions, such as an amplitude between about 0V to about 16V (e.g., corresponding to an industry standard), a bitrate (e.g., bits transmitted per second) of about 1200 bits per second, or other suitable signal properties. The bits 302b and 302c may each have a duration, such as about 0.4 ms. In addition, the bits 302b and 302c may each have an edge transition time, such as a rise time and/or a fall time of between about 3 µs to about 30 µs.

In addition, the non-isolated signal 302 may include additional component signals, such as a voltage spike 302d and an AC power signal 302e. The additional component signals may have signal properties that are outside of the signal properties of the digitally encoded instructions. For example, the voltage spike 302d may have a voltage (e.g., 50V or greater) that exceeds the amplitude of the bits of the instructions. In addition, the AC power signal 302e may have one or more frequencies (e.g., 60 Hz, harmonics of 60 Hz) that either exceed or are below the bitrate of the instructions.

In some implementations, the digital isolation component 320 may modulate the non-isolated signal 302 with a high-frequency signal, to generate a modulated high-frequency signal 303. The modulated high-frequency signal 303 may have a frequency property that is relatively high (e.g., around 50 kHz) compared to component signals included in the non-isolated signal 302. In some cases, the modulated high-frequency signal 303 may have a waveform 303a. The waveform 303a may have one or more portions that correspond to portions of the waveform 302a. For example, the digital isolation component 320 may generate an oscillating portion 303b that corresponds to the high bit 302b. In addition, the digital isolation component 320 may generate a non-oscillating portion 303c that corresponds to the low bit 302c. The modulated high-frequency signal 303 may be provided across the isolation barrier 325. For example, the modulated high-frequency signal 303 may be coupled, such as via one or more components that are configured to couple signals across the barrier 325. In addition, the one or more components may be configured to filter signals based on the frequency of the modulated high-frequency signal 303 (e.g., filter out signals below and/or above about 50 kHz). In some cases, the isolation barrier 325 may filter out (or otherwise eliminate) signals that are not included in the modulated high-frequency signal 303, such as the voltage spike 302d and the AC power signal 302e.

Although FIG. 3b depicts the waveform 303a as having oscillating portions that correspond to high bits and non-oscillating portions that correspond to low bits, other implementations are possible. In some aspects, the digital isolation component 320 may generate a modulated high-frequency signal having oscillating portions that correspond to low bits, and non-oscillating portions that correspond to high bits. In addition, the digital isolation component 320 may generate a modulated high-frequency signal having oscillating and non-oscillating portions that correspond to a voltage change, such as for a bit that is represented by a voltage change (e.g., Manchester encoding). In some cases, the portions 303b and 303c may have a time delay (e.g., about 1-20 ns) as compared to the corresponding bits 302b and 302c.

In some implementations, the digital isolation component 320 may generate an isolated signal 304 based on the modulated high-frequency signal 303. For example, the digital isolation component 320 may demodulate the modulated high-frequency signal 303 to generate the isolated signal 304. The isolated signal 304 may have a waveform 304a. The waveform 304a may have one or more portions that correspond to portions of the waveform 303a. For example, the digital isolation component 320 may generate a high bit 304b that corresponds to the oscillating portion 303b. The high bit 304b may have a first voltage level that corresponds to the voltage level of the high bit 302b. In addition, the digital isolation component 320 may generate a low bit 304c that corresponds to the non-oscillating portion 303c. The low bit 304c may have a second voltage level that corresponds to the voltage level of the low bit 302c. In some cases, the digital isolation component 320 may generate an isolated signal having lower voltage levels that correspond to high bits of the non-isolated signal, and having higher voltage levels that correspond to low bits of the non-isolated signal (e.g., high and low bits may be reversed). In some cases, the bits 304b and 304c may have a time delay (e.g., about 1-20 ns) as compared to the corresponding portions 303b and 303c. In addition, the bits 304b and 304c may have an edge transition time. In some cases, the digital isolation component 320 (or a transceiver in which the component 320 is included) may include one or more components configured to adjust a rising edge and/or a falling edge of one or both of the bits 304b and 304c, such as an adjustment to a rise time and/or a fall time. In some cases, the adjustment may balance a duty cycle of the waveform, such as waveform 304a. In addition, the digital isolation component 320 (or a transceiver in which the component 320 is included) may include one or more components configured to adjust a voltage level of the isolated signal 304 (e.g., one or both of the bits 304b and 304c), such as an adjustment to a low-voltage level of between about 0V to about 3V.

In some implementations, the digital isolation component 320 may accept an isolated signal 312. The isolated signal 312 may be accepted via an input on an isolated side of the digital isolation component 320, such as an input to the channel 328. The isolated signal 312 may be accepted by a transmission sub-circuit in a transceiver, such as from a signal generator configured to produce signals including instructions for a DALI lighting system. The isolated signal 312 may include digitally encoded instructions, such as an outbound signal. In some cases, the isolated signal 312 may have a waveform with one or more properties related to the digitally encoded instructions, such as an amplitude or a bitrate, as described above. In some cases, the isolated signal 312 may have an amplitude corresponding to a low-voltage signal, such as an amplitude between about 0V to about 3V. In addition, the bits represented by the isolated signal 312 may each have attributes, such as a duration or an edge transition time, as described above.

In some implementations, the digital isolation component 320 may modulate the isolated signal 312 with a high-frequency signal, to generate a modulated high-frequency signal 313. The modulated high-frequency signal 313 may have a frequency property that is relatively high compared to the isolated signal 312. In addition, the modulated high-frequency signal 313 may have a frequency property that is relatively high compared to additional signals that may be present on the non-isolated side of the digital isolation component 320, such as the voltage spike 302d or the AC power signal 302e. The modulated high-frequency signal 313 may include oscillating portions (or non-oscillating portions) that correspond to high bits (or low bits) of the digitally encoded instructions represented by the isolated signal 312. The modulated high-frequency signal 313 may be provided across the isolation barrier 325, such as via one or more components that are configured to couple signals across the barrier 325, or to filter signals based on the frequency of the modulated high-frequency signal 313 (e.g., filter out signals below and/or above about 50 kHz). In some cases, the isolation barrier 325 may filter out (or otherwise eliminate) signals that are not included in the modulated high-frequency signal 313. In some cases, signals that are filtered (or otherwise eliminated) from the modulated high-frequency signals 303 and 313 may be prevented from affecting the isolated side of the digital isolation component 320, or isolated components/circuits connected to the digital isolation component.

In some implementations, the digital isolation component 320 may generate a non-isolated signal 314 based on the modulated high-frequency signal 313. For example, the digital isolation component 320 may demodulate the modulated high-frequency signal 313 to generate the non-isolated signal 314. The non-isolated signal 314 may include high bits (or low bits) that correspond to oscillating portion (or non-oscillating portions) of the modulated high-frequency signal 313. In addition, the high (or low) bits of the non-isolated signal 314 may correspond to high (or low) bits of the digitally encoded instructions represented by the isolated signal 312. In some cases, the digital isolation component 320 may generate a non-isolated signal having lower voltage levels that correspond to high bits of the isolated signal, and having higher voltage levels that correspond to low bits of the isolated signal (e.g., high and low bits may be reversed). In some cases, one or more of the signals 313 or 314 may have a time delay (e.g., about 1-20 ns) as compared to the isolated signal 312. In addition, the digital isolation component 320 (or a transceiver in which the component 320 is included) may include one or more components configured to adjust a voltage level of the non-isolated signal 314, such as an adjustment to an industry standard of between about 0V to about 16V.

Figure 4:
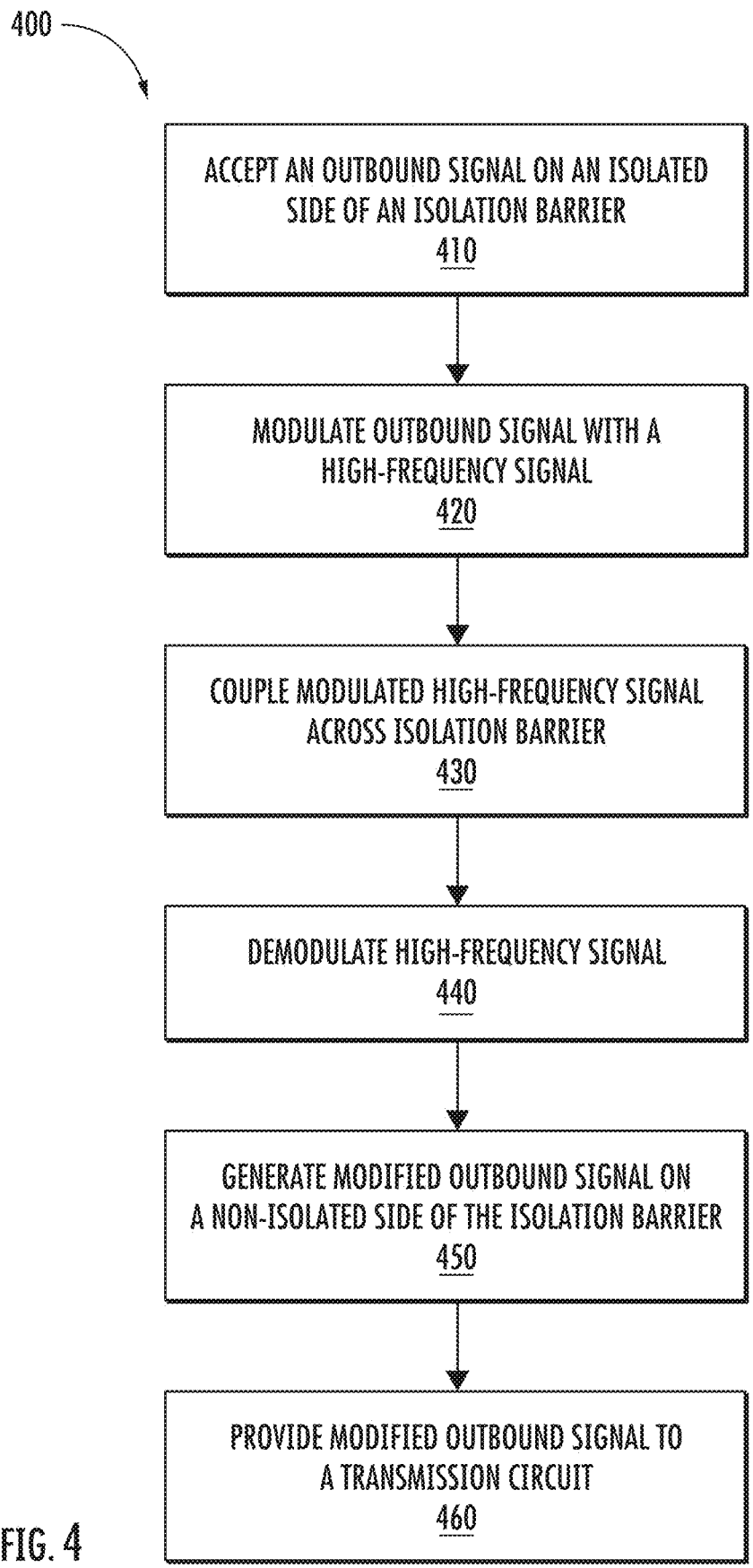
FIG. 4 is a flow chart depicting an example of a process for generating an outbound digital signal that is based on an isolated outbound digital signal.

FIG. 4 is a flow chart depicting an example of a process 400 for generating a non-isolated outbound digital signal that is based on an isolated outbound digital signal. In some implementations, such as described in regards to FIGS. 1-3, one or more components, such as circuit components included in (or connected to) a transmission channel in a multi-channel digital isolation component included in a transceiver, may implement one or more of the operations described in FIG. 4. For illustrative purposes, the process 400 is described with reference to the examples depicted in FIGS. 1-3. Other implementations, however, are possible.

At block 410, the process 400 involves accepting an outbound electrical signal on an isolated side of an isolation barrier, such as an isolation barrier included in a transceiver. In some cases, the accepted signal is a signal for transmission by the transceiver. The outbound signal may be accepted via a first input provided to a first channel that is included in a digital isolation component. For example, the digital isolation component 220 may accept the outbound signal 202 on an input 221, on the isolated side of the transceiver 200. The accepted outbound signal may be a digital signal, such as an electrical signal that includes digital information represented by one or more bits. In some cases, the accepted outbound signal may include one or more digitally encoded instructions, such as binary digital instructions associated with a component in a DALI lighting system. In addition, the accepted outbound signal may be an isolated electrical signal, such as an electrical signal that omits additional electrical signals that are unrelated to the digitally encoded instructions.

At block 420, the process 400 involves modulating the outbound signal with a high-frequency signal. The outbound signal may be modulated via the first channel of the digital isolation component. In some cases, the modulated high-frequency signal may represent digital instructions included in the accepted outbound signal. For example, one or more components included in the digital isolation component 220 may encode the outbound signal 202 as a high-frequency signal, such as by generating a modulated high-frequency signal via the channel 222. In addition, the modulated high-frequency signal generated by the components of the digital isolation component 220 may include information corresponding to information represented by the outbound signal 202.

At block 430, the process 400 involves coupling the modulated high-frequency signal across the isolation barrier, such as from the isolated side to the non-isolated side. In some cases, the modulated high-frequency signal may be provided to the non-isolated side of the barrier via the first channel of the digital isolation component. For example, the digital isolation component 220 may provide a modulated high-frequency signal across the isolation barrier 225 to the non-isolated side of the transceiver 200.

At block 440, the process 400 involves demodulating the modulated high-frequency signal. The modulated high-frequency signal may be demodulated via the first channel of the digital isolation component. For example, one or more components included in the digital isolation component 220 may be configured to demodulate the signal by removing signal components of the high-frequency signal. In some cases, the demodulated signal generated by the components of the digital isolation component 220 may include information corresponding to information represented by the outbound signal 202.

At block 450, the process 400 involves generating a modified outbound signal on the non-isolated side of the isolation barrier, such as a modified outbound signal based on the demodulated signal. The modified outbound signal may be a digital signal, such as an electrical signal that includes digital information represented by one or more bits. In addition, the modified outbound signal may be a non-isolated electrical signal, such as a signal that includes additional electrical signals unrelated to the digitally encoded instructions represented by the outbound signal. In some cases, the additional electrical signals may be introduced to the modified outbound signal on the non-isolated side of the transceiver. In some cases, the modified outbound signal may include digital instructions represented by one or more of the received outbound signal or the high-frequency signal. For example, based on the high-frequency signal provided across the isolation barrier 225 via the channel 222, the digital isolation component 220 may generate the modified outbound signal 202a on the non-isolated side of the transceiver 200. In addition, the modified outbound signal 202a may include digitally encoded instructions corresponding to the digitally encoded instructions included in the outbound signal 202.

At block 460, the process 400 involves providing the modified outbound signal to a transmission circuit, such as a transmission sub-circuit included in a transceiver. The modified outbound signal may be provided via a first output, such as an output of the first channel that is included in the digital isolation component. For example, the digital isolation component 220 may provide the modified outbound signal 202a on the output 223, on the isolated side of the transceiver 200. In some implementations, the transmission circuit may provide the modified outbound signal to a signal bus, such as the signal bus 270.

In some implementations, a digital isolation component includes multiple channels that are configured to provide an electrical signal across the isolation barrier. In some cases, a first channel may provide an electrical signal from an isolated side of the barrier to a non-isolated side of the barrier. In some cases, the first channel may be a transmission channel. In addition, a second channel may provide electrical signal from the non-isolated side of the barrier to the isolated side. In some cases, the second channel may be a receiver channel. In some implementations, a transceiver that includes the multi-channel digital isolation component may generate, via the first channel, a non-isolated signal that is based on an isolated signal. In addition, the transceiver including the multi-channel digital isolation component may generate, via the second channel, an isolated signal that is based on a non-isolated signal.

Figure 5:
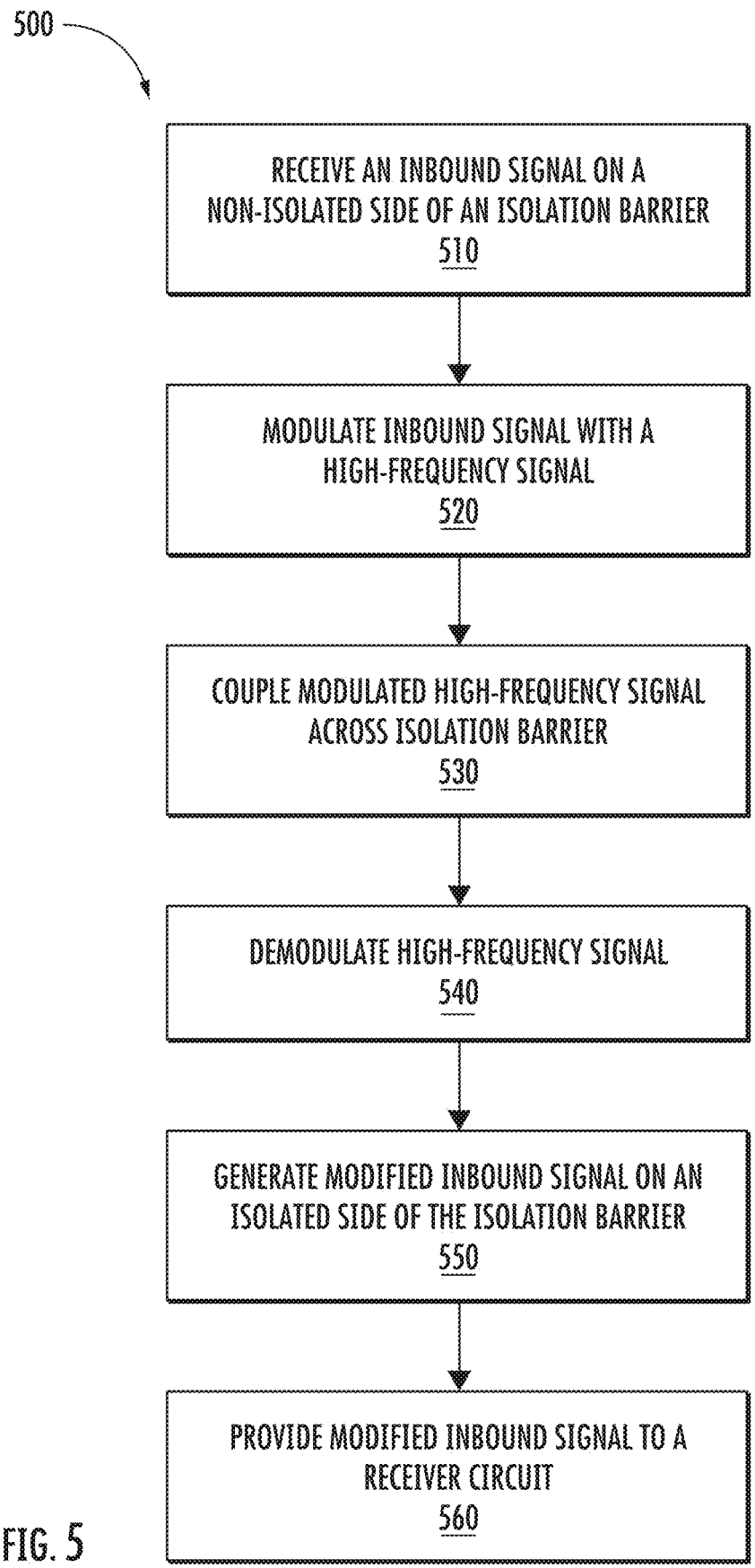
FIG. 5 is a flow chart depicting an example of a process for generating an isolated inbound digital signal that is based on an inbound digital signal.

FIG. 5 is a flow chart depicting an example of a process 500 for generating an isolated inbound digital signal that is based on a non-isolated inbound digital signal. In some implementations, such as described in regards to FIGS. 1-4, one or more components, such as circuit components included in (or connected to) a receiver channel in a multi-channel digital isolation component included in a transceiver, may implement one or more of the operations described in FIG. 5. For illustrative purposes, the process 500 is described with reference to the examples depicted in FIGS. 1-4. Other implementations, however, are possible.

At block 510, the process 500 involves accepting an inbound electrical signal on a non-isolated side of an isolation barrier, such as an isolation barrier included in a transceiver. In some cases, the accepted signal is a signal received by the transceiver. The inbound signal may be accepted via a second input provided to a second channel that is included in a digital isolation component, such as a second channel of the digital isolation component described in regards to FIG. 4. For example, the digital isolation component 220 may accept the inbound signal 206 on an input 227, on the non-isolated side of the transceiver 200. The accepted inbound signal may be a digital signal, such as an electrical signal that includes digital information represented by one or more bits. In some cases, the accepted inbound signal may include one or more digitally encoded instructions, such as binary digital instructions associated with a component in a DALI lighting system. In addition, the accepted inbound signal may include additional electrical signals unrelated to the digitally encoded instructions, such as electrical noise.

At block 520, the process 500 involves modulating the inbound signal with a high-frequency signal. The inbound signal may be modulated via the second channel of the digital isolation component. In some cases, the modulated high-frequency signal may represent digital instructions included in the accepted inbound signal. For example, one or more components included in the digital isolation component 220 may encode the inbound signal 206 as an additional high-frequency signal, such as by generating an additional modulated high-frequency signal via the channel 228. In addition, the additional modulated high-frequency signal generated by the components of the digital isolation component 220 may include information corresponding to information represented by the inbound signal 206.

At block 530, the process 500 involves coupling the additional modulated high-frequency signal across the isolation barrier, such as from the non-isolated side to the isolated side. In some cases, the additional modulated high-frequency signal may be provided to the isolated side of the barrier via the second channel of the digital isolation component. For example, the digital isolation component 220 may provide an additional modulated high-frequency signal across the isolation barrier 225 to the isolated side of the transceiver 200.

At block 540, the process 500 involves demodulating the additional modulated high-frequency signal. The additional modulated high-frequency signal may be demodulated via the second channel of the digital isolation component. For example, one or more components included in the digital isolation component 220 may be configured to demodulate the signal by removing signal components of the high-frequency signal. In some cases, the additional demodulated signal generated by the components of the digital isolation component 220 may include information corresponding to information represented by the inbound signal 206.

At block 550, the process 500 involves generating a modified inbound signal on the isolated side of the isolation barrier, such as a modified inbound signal based on the additional demodulated signal. The modified inbound signal may be a digital signal, such as an electrical signal that includes digital information represented by one or more bits. In addition, the modified inbound signal may be an isolated electrical signal, such as by omitting additional electrical signals that were included on the received inbound signal, that are not related to digitally encoded instructions represented by the inbound signal. In some cases, the modified inbound signal may include digital instructions represented by one or more of the received inbound signal or the high-frequency signal. For example, based on the high-frequency signal provided across the isolation barrier 225 via the channel 228, the digital isolation component 220 may generate the modified inbound signal 206a on the isolated side of the transceiver 200. In addition, the modified inbound signal 206a may include digitally encoded instructions corresponding to the digitally encoded instructions included in the inbound signal 206.

At block 560, the process 500 involves providing the modified inbound signal to a receiver circuit, such as a receiver sub-circuit included in a transceiver. The modified inbound signal may be provided via a second output, such as an output of the second channel that is included in the digital isolation component. For example, the digital isolation component 220 may provide the modified inbound signal 206a on the output 229, on the isolated side of the transceiver 200. In some implementations, the receiver circuit may provide the modified inbound signal to a component of the DALI lighting system, such as the lighting component 290. In addition, the receiver circuit may provide the modified inbound signal to a low-voltage component of the transceiver, such as to a microprocessor configured to receive and interpret signals related to low-voltage controls.

Figure 6:
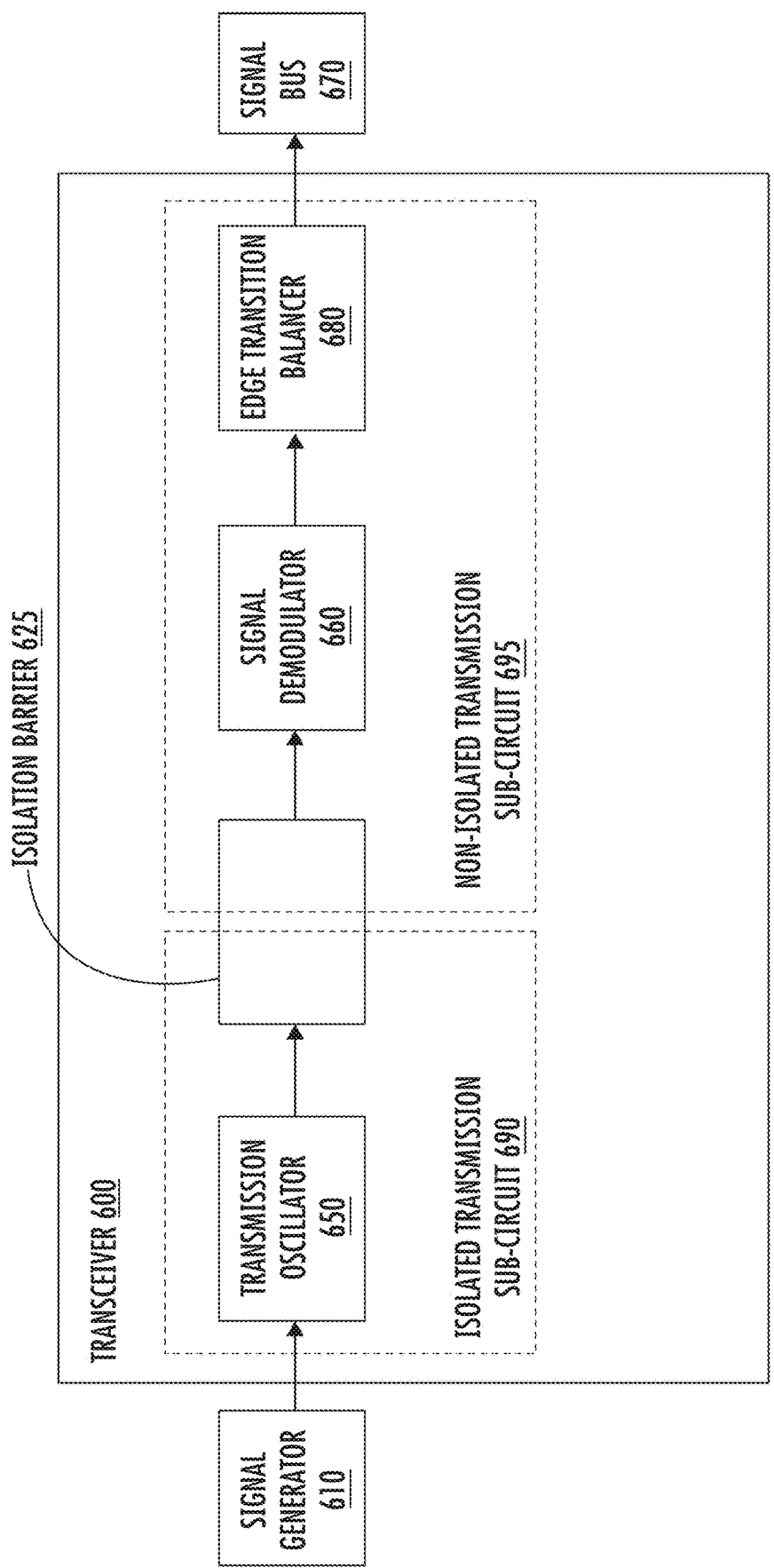
FIG. 6 is a block diagram depicting an example of a transceiver including a transmission circuit having an isolated transmission sub-circuit and a non-isolated transmission sub-circuit.

In some implementations, a transceiver includes a transmission circuit (or sub-circuit) that has an isolated portion and a non-isolated portion. FIG. 6 includes a block diagram depicting an example of a transceiver 600 that may be included in a DALI lighting system. The transceiver 600 may include a transmission circuit having an non-isolated transmission sub-circuit 695 and an isolated transmission sub-circuit 690. The isolated sub-circuit 690 may accept electrical signals from a signal generator 610, such as a DALI signal generator capable of generating digital binary signals. In some cases, the signal generator 610 may be an encoder, such as an encoder that is capable of encoding digital binary instructions. In addition, the non-isolated sub-circuit 695 may provide electrical signals, including a modified signal based on a received signal, to a signal bus 670, such as a signal bus in the DALI lighting system.

In some cases, the non-isolated sub-circuit 695 may be configured such that the electrical signal from the signal generator 610 may be combined with additional electrical signals. For example, components or circuits included in (or in communication with) the non-isolated sub-circuit 695 may be non-isolated, such that the additional signals are capable of being introduced to the non-isolated components or circuits. In the non-isolated sub-circuit 695, electrical signals may, in some cases, combine with additional electrical signals, such as to form composite signals with properties of multiple component signals. In addition, the isolated sub-circuit 690 may be configured to prevent an isolated signal from being combined with additional electrical signals. For example, components or circuits included in (or in communication with) the isolated sub-circuit 690 may be isolated, such that additional signals are not introduced to the isolated components or circuits.

In some cases, the isolated sub-circuit 690 may accept from the signal generator 610 a signal including digitally encoded instructions. For example, the isolated sub-circuit 690 may accept a digital signal including a binary waveform that indicates high and low bits of an instruction for a component in the DALI lighting system (such as described in regards to FIG. 3). In some cases, the digital signal accepted by the isolated sub-circuit 690 is an outbound digital signal. In some implementations, the outbound digital signal may be accepted by a transmission oscillator 650 that is included in the isolated sub-circuit 690. The transmission oscillator 650 may include one or more components capable of providing a reference signal that oscillates at a frequency that is relatively high compared to a bit rate of the digital signal. In addition, the transmission oscillator 650 may include one or more components that may generate a signal with or without oscillations of the reference signal. For example, the transmission oscillator 650 may include an amplitude shift keying ("ASK") modulator, that is capable of generating a signal that is "keyed" to the digital signal. In some implementations, a digital isolation component (such as the digital isolation component 220 described in regards to FIG. 2) may include one or more components of a transmission oscillator, such as the transmission oscillator 650.

In the transceiver 600, the transmission oscillator 650 may generate a modulated high-frequency signal that is based on the outbound digital signal. For example, the transmission oscillator 650 may modulate the reference signal with the outbound digital signal, such as by providing the high-frequency oscillations of the reference signal while the outbound digital signal indicates a high bit and omitting the high-frequency oscillations of the reference signal while the outbound digital signal indicates a low bit. Based on the combination of the outbound digital signal and the reference signal, the transmission oscillator 650 may generate a modulated high-frequency signal that includes periods of high-frequency oscillations corresponding to high bits of the digitally encoded instructions and periods without high-frequency oscillations corresponding to low bits of the digitally encoded instructions. In some configurations, the modulated high-frequency signal may include periods of high-frequency oscillations corresponding to low bits of the digitally encoded instructions and periods without high-frequency oscillations corresponding to high bits of the digitally encoded instructions.

In some implementations, the transmission oscillator 650 may provide the modulated high-frequency signal to an isolation barrier 625. The modulated high-frequency signal may be coupled across the isolation barrier 625. A non-isolated high-frequency signal may be based on the modulated high-frequency signal. For example, the isolation barrier 625 may provide a non-isolated high-frequency signal that includes high-frequency oscillations corresponding to bits of the digitally encoded instructions and omits electrical signals that are not associated with the digitally encoded instructions. In some cases, the isolation barrier 625 may include one or more reactive elements that are configured to remove electrical signals not associated with the digitally encoded instructions. The isolation barrier 625 may include reactive elements that are configured to filter a range of frequencies, such that the high-frequency oscillations are allowed to pass the isolation barrier 625. In addition, the reactive elements may be configured such that frequencies higher or lower than the high-frequency oscillations are prevented from passing the isolation barrier 625 (e.g., filtered out). In addition, a first portion of components in the isolation barrier 625 may be included in the isolated sub-circuit 690, and a second portion of the components in the isolation barrier 625 may be included in the non-isolated sub-circuit 695. In some implementations, a digital isolation component (such as the digital isolation component 220) may include one or more components of an isolation barrier, such as the isolation barrier 625.

In the transceiver 600, the isolation barrier 625 may provide the non-isolated high-frequency signal to a signal demodulator 660 that is included in the non-isolated sub-circuit 695. The signal demodulator 660 may demodulate the non-isolated high-frequency signal, such as by removing high-frequency signal components The signal demodulator 660 may generate a first modified outbound digital signal, based on the demodulated signal. The first modified outbound digital signal may include the digitally encoded instructions. For example, the first modified outbound digital signal may include portions that correspond to high bits and/or low bits of the digitally encoded instructions from the signal generated by the signal generator 610. In addition, the first modified outbound digital signal may include electrical signals that are not associated with the digitally encoded instructions. For example, the first modified outbound digital signal may include one or more frequencies associated with an AC power supply of the transceiver 600. In some cases, the signal demodulator 660 may include one or more components configured to detect the high-frequency oscillations included in the non-isolated high-frequency signal. In addition, the signal demodulator 660 may include one or more components configured to detect a range of frequencies associated with the high-frequency signal, such as a narrow bandwidth band-pass filter and a frequency detector. In some cases, the band-pass filter may be configured to pass through a relatively narrow range of frequencies that includes the frequency of the non-isolated high-frequency signal, and the frequency detector may be configured to detect the frequency of the non-isolated high-frequency signal (e.g., in the narrow range of frequencies passed through by the band-pass filter). In some cases, the signal demodulator 660 and the signal generator 610 may be implemented by a particular component, such as a microcontroller capable of encoding and decoding digital binary signals.

In some implementations, the signal demodulator 660 may provide a portion of the first modified outbound digital signal at a voltage level corresponding to the demodulated high-frequency signal. For example, for a first period of high-frequency oscillations, the signal demodulator 660 may provide a first portion of the first modified outbound digital signal at a relatively higher voltage (e.g., about 16V). In addition, for a second period without high-frequency oscillations, the signal demodulator 660 may provide a second portion of the first modified outbound digital signal at a relatively lower voltage (e.g., about 0V). In some cases, the higher voltage portions may correspond to high bits of the digitally encoded instructions and the lower voltage portions may correspond to low bits of the digitally encoded instructions. In some implementations, a digital isolation component (such as the digital isolation component 220) may include one or more components of a signal demodulator, such as the signal demodulator 660.

The signal demodulator 660 may provide the first modified digital signal to an edge transition balancer 680 that is included in the non-isolated sub-circuit 695. The edge transition balancer 680 may generate a second modified outbound digital signal based on the first modified digital signal. In some cases, the edge transition balancer 680 may include one or more components configured to adjust one or both of a falling edge or a rising edge of the first modified outbound digital signal. For example, a bit represented by the first modified outbound digital signal may have a rising edge and/or a falling edge with a transition time of greater than about 30 μs. The edge transition balancer 680 may generate the second modified outbound digital signal having an adjusted falling edge, such that the rising edge and the falling edge of the bit represented by the second modified outbound digital signal are each between about 3 μs to about 30 μs. In addition, the edge transition balancer 680 may generate the second modified outbound digital signal having an adjusted rising edge, or having an adjusted rising edge and an adjusted falling edge. In some cases, the second modified outbound signal having the adjusted edges may be provided to a signal bus for a DALI lighting system, such as the signal bus 670. In some implementations, a digital isolation component (such as the digital isolation component 220) may include one or more components of an edge transition balancer, such as the edge transition balancer 680. In some cases, a transceiver including an edge transition balancer may provide a signal (such as the second modified outbound signal) with a balanced duty cycle, such as a duty cycle of about 50%.

FIG. 6 depicts the edge transition balancer 680 as accepting a signal from the signal demodulator 660, but other configurations are possible. For example, the edge transition balancer 680 may be configured to accept a signal from the isolation barrier 625, or be included in the isolated sub-circuit 690. In some cases, the edge transition balancer 680 is included in an additional component of the transceiver 600. For example, the edge transition balancer 680 may be included in a signal driver, such as a DALI signal driver that is configured to provide the second modified outbound signal to the signal bus 670. The signal driver (or other components included in a transceiver) may adjust a voltage level of a modified outbound signal, such as by adjusting a voltage of a high bit from about 3 V to about 16 V.

In some implementations, a transceiver includes a receiver circuit or sub-circuit that has an isolated portion and a non-isolated portion. In addition, the transceiver may include both a transmission circuit (or sub-circuit) and a receiver circuit (or sub-circuit). The transmission circuit and the receiver circuit may each have an isolated and a non-isolated side. The transceiver may include a digital isolation component that provides at least one channel for the transmission circuit and at least one channel for the receiver circuit, such that each of the channels is capable of providing signals across the isolation barrier.

Figure 7:
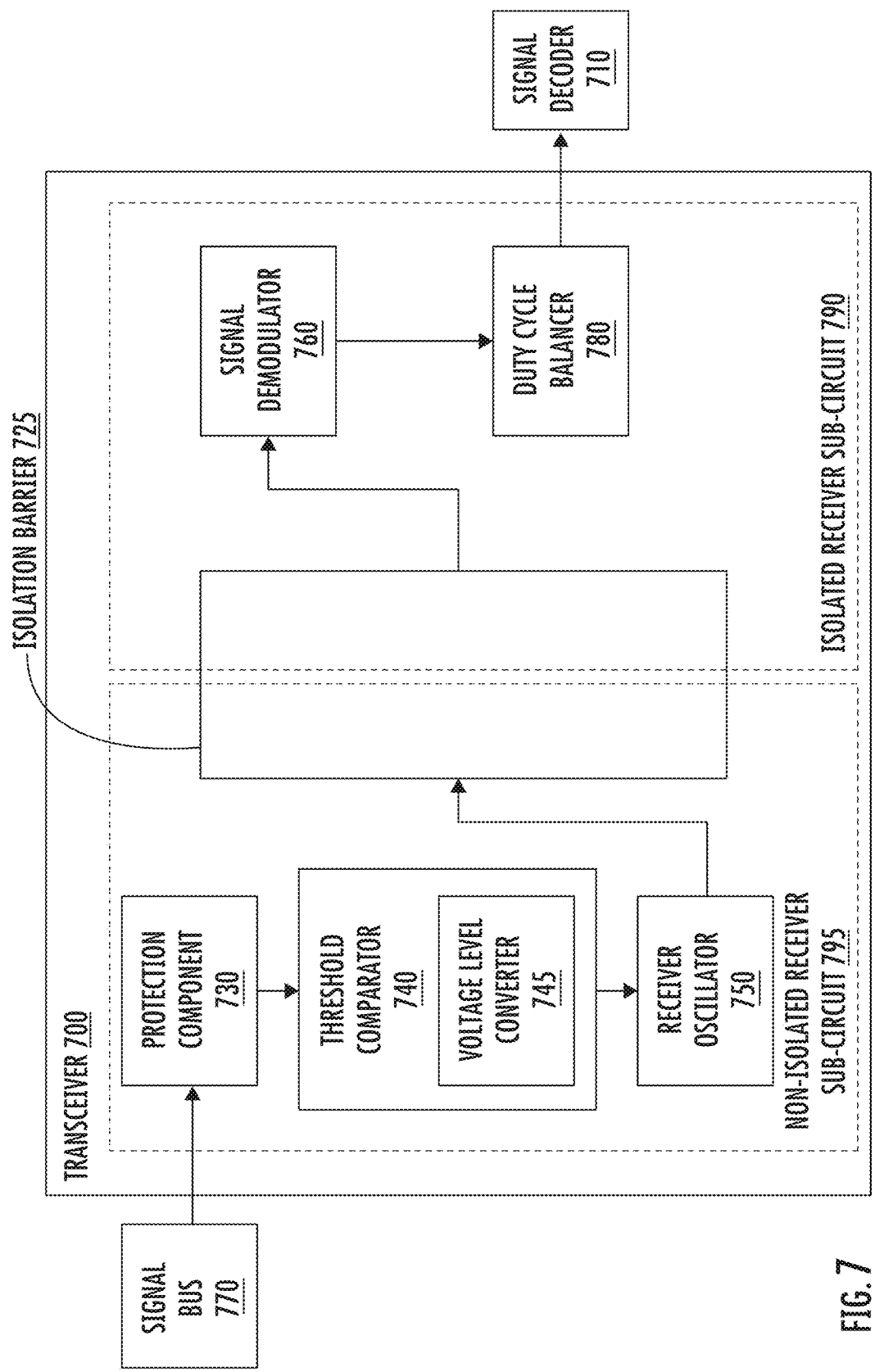
FIG. 7 is a block diagram depicting an example of a transceiver including a receiver circuit having an isolated receiver sub-circuit and a non-isolated receiver sub-circuit.

FIG. 7 includes a block diagram depicting an example of a transceiver 700 that may be included in a DALI lighting system. The transceiver 700 may include a receiver circuit having a non-isolated receiver sub-circuit 795 and an isolated receiver sub-circuit 790. In some aspects, the transceiver 700 may also include a transmission circuit, such as described in regards to FIG. 6. The non-isolated sub-circuit 795 may receive electrical signals from a signal bus 770, such as a two-wire signal bus in the DALI lighting system. In some cases, the signal bus 770 may be identical to, or in communication with, the signal bus 670 described in regards to FIG. 6. For example, a transceiver (including one or more of the transceivers 600 or 700) may receive signals from and transmit signals on a particular signal bus. In addition, the isolated sub-circuit 790 may provide electrical signals, including a modified signal based on a received signal, to a signal decoder 710, such as a DALI signal decoder. In some aspects, the signal decoder 710, or the signal generator 610 described in regards to FIG. 6, or both, may be included in a particular component in the DALI lighting system.

In some cases, the non-isolated sub-circuit 795 may be configured to provide a particular signal (or signal component) received from the signal bus 770 to the isolated sub-circuit 790, such as a signal representing digital instructions. In addition, the non-isolated sub-circuit 795 may be configured to prevent additional electrical signals (e.g., unwanted signal components) of the received signal from being provided to the isolated sub-circuit 790. For example, circuits or circuit components included in (or in communication with) the non-isolated sub-circuit 795 may be non-isolated, such that additional signals are capable of being introduced to the non-isolated components or circuits. In the non-isolated sub-circuit 795, electrical signals may, in some cases, combine with additional electrical signals, such as to form composite signals with properties of multiple component signals. In addition, the isolated sub-circuit 790 may be configured to prevent additional electrical signals from being combined with the isolated electrical signal. For example, circuits or circuit components included in (or in communication with) the isolated sub-circuit 790 may be isolated, such that the additional signals are not introduced to the isolated components or circuits.

In some cases, the non-isolated sub-circuit 795 may accept a signal including digitally encoded instructions from the signal bus 770. For example, the non-isolated sub-circuit 795 may accept a digital signal including a binary waveform that indicates high and low bits of an instruction for a component in the DALI lighting system (such as described in regards to FIG. 3). In some cases, the digital signal accepted by the non-isolated sub-circuit 795 is an inbound digital signal. In some implementations, the inbound digital signal may be accepted by an protection component 730 that is included in the non-isolated sub-circuit 795. The protection component may be configured to interrupt an electrical connection between the signal bus 770 and the non-isolated sub-circuit 795 or to otherwise protect the sub-circuit 795 (e.g., overvoltage protection in the case of miswiring of the signal bus). For example, the protection component 730 may be configured to determine a voltage, current, or combination of current and voltage that is present on the signal bus 770. In addition, the protection component 730 may be configured to interrupt the electrical connection if the voltage (or current, or combination) on the signal bus 770 exceeds a threshold level. The protection component 730 may include a fuse, a resettable resistor, or any other suitable component(s) configured to detect a reference voltage or current. In some aspects, the protection component 730 may provide protection to the transceiver 700, or to a component of the DALI lighting system, such as by preventing surges of electrical power from affecting the transceiver 700 (e.g., overvoltage protection in the case of miswiring).

In the non-isolated sub-circuit 795, the inbound digital signal may be accepted by a threshold comparator 740. The threshold comparator 740 may include a voltage comparator. In some cases, the threshold comparator 740 may include a current limiter having one or more additional protection components, such as a resettable resistor. In certain aspects, the protection component 730 (or a portion of the protection component 730) may be included in the threshold comparator 740. For example, the threshold comparator 740 may include one or more components configured to detect a reference current or voltage, and to limit the current based on the detected reference.

In some configurations, the threshold comparator 740 may include one or more components configured to adjust a voltage level of the inbound digital signal, such as a voltage level converter 745. The voltage level converter 745 may adjust the inbound digital signal to correspond to a low-voltage level used by the isolation barrier 725, or a digital isolation component in which the isolation barrier 725 is included. For example, the threshold comparator 740 may adjust a voltage level of the inbound digital signal to a low-voltage level of between about 0V to about 3V. In some cases, the voltage level converter 745 may allow a signal carried by the signal bus 770, such as a signal compliant with an industry standard for DALI lighting systems, to be received by the transceiver 700 and adjusted for one or more of the components in the transceiver 700. For example, the voltage level converter 745 may adjust a voltage level of a compliant DALI signal (e.g., a standard-compliant voltage of between about 0V to about 16V) to a low-voltage level (e.g., between about 0V to about 3V) suitable for one or more low-voltage components included in the transceiver 700, such as a digital isolation component. In some configurations, the voltage level converter 745 may improve reliability of the transceiver 700, such as by preventing damage to low-voltage components by relatively higher-voltage signals.

In the non-isolated sub-circuit 795, the inbound digital signal may be accepted by a receiver oscillator 750. In some cases, the receiver oscillator 750 may be the same oscillator as the transmission oscillator 650, such as if a particular oscillator provides a reference signal to a transmission sub-circuit and a receiver sub-circuit. In addition, the receiver oscillator 750 may be a different oscillator from the transmission oscillator 650. The reference signal(s) provided by the transmission oscillator 650 and the receiver oscillator 750 may have the same frequency, or may have different frequencies.

The receiver oscillator 750 may include one or more components capable of providing a reference signal that oscillates at a frequency that is relatively high compared to a bit rate of the digital signal. In addition, the receiver oscillator 750 may include one or more components that may generate a signal with or without oscillations of the reference signal. For example, the receiver oscillator 750 may include an ASK modulator, that is capable of generating a signal that is "keyed" to the inbound digital signal. In addition, the threshold comparator 740 may include one or more components configured to detect a current level or a voltage level of the inbound digital signal. In addition, the threshold comparator 740 may include one or more components configured to enable the receiver oscillator 750 (or a connection with the oscillator 750) based on the detected current or voltage level(s). For example, the threshold comparator 740 may be configured to generate a signal that includes portions of the reference signal from the receiver oscillator 750, based on portions of the inbound digital signal that are above the current or voltage level. For example, the reference signal may be enabled during high bits (or low bits) of the digitally encoded instructions that are included in the inbound digital signal. In some implementations, a digital isolation component (such as the digital isolation component 220 described in regards to FIG. 2) may include one or more components of a receiver oscillator or a threshold comparator, such as the receiver oscillator 750 or the threshold comparator 740.

In the transceiver 700, the receiver oscillator 750 may generate a high-frequency signal that is based on the inbound digital signal. For example, the receiver oscillator 750 may combine the reference signal with the inbound digital signal, such as by providing the high-frequency oscillations of the reference signal while the inbound digital signal indicates a high bit and omitting the high-frequency oscillations of the reference signal while the inbound digital signal indicates a low bit. Based on the combination of the inbound digital signal and the reference signal, the receiver oscillator 750 may generate a high-frequency signal that includes periods of high-frequency oscillations corresponding to high bits of the digitally encoded instructions and periods without the high-frequency oscillations corresponding to low bits of the digitally encoded instructions. In some configurations, the generated high-frequency signal may include periods of high-frequency oscillations corresponding to low bits of the digitally encoded instructions and periods without the high-frequency oscillations corresponding to high bits of the digitally encoded instructions.

In some implementations, the receiver oscillator 750 may provide the high-frequency signal to an isolation barrier 725. In some cases, the isolation barrier 725 may be the same barrier as the isolation barrier 625, such as if an digital isolation component includes multiple channels. For example, a particular digital isolation component (such as the digital isolation component 220) may include at least one channel configured to provide a high-frequency signal based on an inbound digital signal across an isolation barrier to an isolated side, and at least one additional channel configured to provide an additional high-frequency signal based on an outbound digital signal across the isolation barrier to a non-isolated side. In addition, the isolation barrier 725 may be a different barrier from the isolation barrier 625.

The isolation barrier 725 may provide an isolated high-frequency signal based on the high-frequency signal. For example, the isolation barrier 725 may provide a modified high-frequency signal that includes high-frequency oscillations corresponding to bits of the digitally encoded instructions and omits electrical signals that are not associated with the digitally encoded instructions. In some cases, the isolation barrier 725 may include one or more reactive elements that are configured to remove electrical signals not associated with the digitally encoded instructions. The isolation barrier 725 may include reactive elements that are configured to filter a range of frequencies, such that the high-frequency oscillations are allowed to pass the isolation barrier 725. In addition, the reactive elements may be configured such that frequencies higher or lower than the high-frequency oscillations are prevented from passing the isolation barrier 725 (e.g., filtered out). In addition, a first portion of components in the isolation barrier 725 may be included in the isolated sub-circuit 790, and a second portion of the components in the isolation barrier 725 may be included in the non-isolated sub-circuit 795. In some implementations, a digital isolation component (such as the digital isolation component 220) may include one or more components of an isolation barrier, such as the isolation barrier 725.

In the transceiver 700, the isolation barrier 725 may provide the isolated high-frequency signal to a signal demodulator 760 that is included in the isolated sub-circuit 790. The signal demodulator 760 may generate, based on the isolated high-frequency signal, a first modified inbound digital signal that includes the digitally encoded instructions. In addition, the first modified inbound digital signal may omit electrical signals that are not associated with the digitally encoded instructions. In some cases, the signal demodulator 760 may include one or more components configured to detect the high-frequency oscillations included in the isolated high-frequency signal. In addition, the signal demodulator 760 may provide a portion of the first modified inbound digital signal at a voltage level corresponding to the detected oscillations. For example, for a first period of high-frequency oscillations, the signal demodulator 760 may provide a first portion of the first modified inbound digital signal at a relatively higher voltage (e.g., 5V, 3V). In addition, for a second period without high-frequency oscillations, the signal demodulator 760 may provide a second portion of the first modified inbound digital signal at a relatively lower voltage (e.g., 0V). In some cases, the higher voltage portions may correspond to high bits of the digitally encoded instructions and the lower voltage portions may correspond to low bits of the digitally encoded instructions. In some implementations, a digital isolation component (such as the digital isolation component 220) may include one or more components of a signal demodulator, such as the signal demodulator 760. In addition, the signal demodulator 760 may be implemented by a microcontroller capable of encoding and/or decoding digital binary signals, such as one or more microcontrollers implementing one or more of the signal demodulator 660 and the signal generator 610.

The signal demodulator 760 may provide the first modified inbound digital signal to a duty cycle balancer 780 that is included in the isolated sub-circuit 790. The duty cycle balancer 780 may generate a second modified inbound digital signal based on the first modified inbound digital signal. In some cases, the duty cycle balancer 780 may include one or more components configured to adjust one or both of a falling edge or a rising edge of the first modified inbound digital signal. For example, a bit represented by the first modified inbound digital signal may have a rising edge and a falling edge, each with a transition time of between about 0.1 ns to about 10 ns. In some cases, the rising edge and falling edge may have different transition times. The duty cycle balancer 780 may generate the second modified inbound digital signal having an adjusted falling edge and/or an adjusted rising edge, such that a duty cycle of the bits represented by the second modified inbound digital signal is about 50%. In some implementations, a digital isolation component (such as the digital isolation component 220) may include one or more components of a duty cycle balancer, such as the duty cycle balancer 780.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A transceiver in a digital addressable lighting interface ("DALI") controller system, the transceiver including:
   a transmission sub-circuit,
   a receiver sub-circuit, and
   a digital isolation component comprising at least one channel and an isolation barrier, wherein an input of the transmission sub-circuit is coupled to a first output of the digital isolation component and an input of the receiver sub-circuit is coupled to a second output of the digital isolation component,
   wherein the digital isolation component is capable of:
      accepting, on a first input of the digital isolation component, an outbound digital signal comprising an encoded instruction for a DALI lighting component, wherein the first input is provided to a first channel of the digital isolation component, and the first input is on an isolated side of the isolation barrier;
      modulating the outbound digital signal with a high-frequency signal;
      coupling the modulated high-frequency signal across the isolation barrier to a non-isolated side of the isolation barrier;
      demodulating, on the non-isolated side of the isolation barrier, the modulated high-frequency signal;
      generating a modified outbound digital signal based on the demodulated signal, wherein the modified outbound digital signal comprises the encoded instruction; and
      providing, on the first output of the digital isolation component to the input of the transmission sub-circuit, the modified outbound digital signal, wherein the first output is provided from the first channel.

2. The transceiver of claim 1, wherein the transmission sub-circuit is capable of:
   providing, to a signal bus of the DALI controller system and via an output of the transmission sub-circuit, the modified outbound digital signal.

3. The transceiver of claim 1, wherein the digital isolation component is further capable of:
   accepting, on a second input of the digital isolation component, an inbound digital signal comprising an additional encoded instruction for the DALI lighting component, wherein the second input is provided to a second channel of the digital isolation component, and the second input is on the non-isolated side of the isolation barrier;
   modulating the inbound digital signal with an additional high-frequency signal;

coupling the additional modulated high-frequency signal across the isolation barrier to the isolated side of the isolation barrier;

demodulating, on the isolated side of the isolation barrier, the additional modulated high-frequency signal;

generating a modified inbound digital signal based on the additional demodulated signal, wherein the modified inbound digital signal comprises the additional encoded instruction; and providing, on the second output of the digital isolation component to the input of the receiver sub-circuit, the modified inbound digital signal, wherein the second output is provided from the second channel.

4. The transceiver of claim 3, wherein the receiver sub-circuit is capable of:

providing, to the DALI lighting component and via an output of the receiver sub-circuit, the modified inbound digital signal.

5. The transceiver of claim 3, further comprising a protection component, wherein:

the protection component is located on the non-isolated side of the isolation barrier, and the inbound digital signal is provided, by the receiver sub-circuit and via the protection component, to the second channel of the digital isolation component.

6. The transceiver of claim 3, further comprising a threshold comparator and a voltage level converter, wherein:

the threshold comparator and the voltage level converter are located on the non-isolated side of the isolation barrier, and the voltage level converter is configured to adjust a voltage level of the inbound digital signal.

7. The transceiver of claim 6, wherein the voltage level converter is further configured to adjust the voltage level of the inbound digital signal prior to the accepting the inbound digital signal on the second input of the digital isolation component.

8. The transceiver of claim 1, wherein the isolation barrier is comprised of at least one of capacitive components, magnetic components, galvanic components, or semiconductor components.

9. A transmitter in a digital addressable lighting interface ("DALI") controller system, the transmitter including:

a digital isolation component comprising at least one channel and an isolation barrier, wherein the digital isolation component is capable of:

accepting, on a first input of the transmitter, an outbound digital signal comprising an encoded instruction for a DALI lighting component, wherein the first input is provided to a first channel of the digital isolation component, and the first input is on an isolated side of the isolation barrier;

modulating the outbound digital signal with a high-frequency signal;

coupling the modulated high-frequency signal across the isolation barrier to a non-isolated side of the isolation barrier;

demodulating, on the non-isolated side of the isolation barrier, the modulated high-frequency signal;

generating a modified outbound digital signal based on the demodulated signal, and wherein the modified outbound digital signal comprises the encoded instruction; and providing the modified outbound digital signal on a first output of the transmitter, wherein the first output is provided from the first channel.

10. The transmitter of claim 9, wherein:

the digital isolation component further includes an oscillator associated with the first channel, and the modulated high-frequency signal is generated based on a combination of the outbound digital signal and a signal from the oscillator.

11. The transmitter of claim 9, wherein the modified outbound digital signal is provided to a signal bus of the DALI controller system.

12. The transmitter of claim 9, further comprising a receiver circuit, wherein the digital isolation component is further capable of:

accepting, on a second input of the digital isolation component, an inbound digital signal comprising an additional encoded instruction for the DALI lighting component, wherein the second input is provided to a second channel of the digital isolation component, and the second input is on the non-isolated side of the isolation barrier;

modulating the inbound digital signal with an additional high-frequency signal;

coupling the additional modulated high-frequency signal across the isolation barrier to the isolated side of the isolation barrier;

demodulating, on the isolated side of the isolation barrier, the additional modulated high-frequency signal;

generating a modified inbound digital signal based on the additional demodulated signal, wherein the modified inbound digital signal comprises the additional encoded instruction; and providing the modified inbound digital signal on a second output of the transmitter, wherein the second output is provided from the second channel.

13. The transmitter of claim 12, wherein the modified inbound digital signal is provided to a lighting component of the DALI controller system.

14. The transmitter of claim 9, wherein the modulated high-frequency signal includes an oscillating segment corresponding to a first state of the outbound digital signal, and a direct current ("DC") segment corresponding to a second state of the outbound digital signal.

15. A receiver in a digital addressable lighting interface ("DALI") controller system, the receiver including:

a digital isolation component comprising at least one channel and an isolation barrier, wherein the digital isolation component is capable of:

accepting, on a first input of the receiver, an inbound digital signal comprising an encoded instruction for a DALI lighting component, wherein the first input is provided to a first channel of the digital isolation component, and the first input is on a non-isolated side of the isolation barrier;

modulating the inbound digital signal with a high-frequency signal;

coupling the modulated high-frequency signal across the isolation barrier to an isolated side of the isolation barrier;

demodulating, on the non-isolated side of the isolation barrier, the modulated high-frequency signal;

generating a modified inbound digital signal based on the demodulated signal, wherein the modified inbound digital signal comprises the encoded instruction; and providing the modified inbound digital signal on a first output of the receiver, wherein the first output is provided from the first channel.

16. The receiver of claim 15, wherein:
the digital isolation component further includes an oscillator associated with the first channel, and
the modulated high-frequency signal is generated based on a combination of the inbound digital signal and a signal from the oscillator.

17. The receiver of claim 15, wherein the modified inbound digital signal is provided to the DALI lighting component.

18. The receiver of claim 15, further comprising a transmitter circuit, wherein the digital isolation component is further capable of:
accepting, on a second input of the receiver, an outbound digital signal comprising an additional encoded instruction for the DALI lighting component, wherein the second input is provided to a second channel of the digital isolation component, and the second input is on the isolated side of the isolation barrier;
modulating the outbound digital signal with an additional high-frequency signal;
coupling the additional modulated high-frequency signal across the isolation barrier to the non-isolated side of the isolation barrier;
demodulating, on the non-isolated side of the isolation barrier, the additional modulated high-frequency signal;
generating a modified outbound digital signal based on the additional demodulated signal, and wherein the modified outbound digital signal comprises the additional encoded instruction; and
providing the modified outbound digital signal on a second output of the receiver, wherein the second output is provided from the second channel.

19. The receiver of claim 18, further comprising a threshold comparator and a voltage level converter, wherein:
the threshold comparator and the voltage level converter are located on the non-isolated side of the isolation barrier, and
the voltage level converter is configured to adjust a voltage level of the inbound digital signal.

20. The receiver of claim 15, wherein the modulated high-frequency signal includes an oscillating segment corresponding to a first state of the inbound digital signal, and a direct current ("DC") segment corresponding to a second state of the inbound digital signal.

* * * * *